United States Patent [19]
Skuse

[11] Patent Number: 6,007,677
[45] Date of Patent: Dec. 28, 1999

[54] APPARATUS AND METHOD FOR MANUFACTURING CONTINUOUS LAMINATED WOOD STOCK

[75] Inventor: Thomas P. Skuse, Rancho Cucamonga, Calif.

[73] Assignee: G. W. Manufacturing Co., Inc., Rancho Cucamonga, Calif.

[21] Appl. No.: 08/985,595

[22] Filed: Dec. 5, 1997

[51] Int. Cl.$^6$ .................................................. B32B 31/20
[52] U.S. Cl. .................................. 156/380.2; 156/380.6; 156/583.5; 156/583.91; 156/274.6; 156/274.8
[58] Field of Search ........................... 156/273.7, 274.4, 156/274.6, 274.8, 275.5, 275.7, 379.8, 380.2, 380.4, 380.6, 583.5, 583.91; 219/765; 100/151

[56] References Cited

U.S. PATENT DOCUMENTS

| | | |
|---|---|---|
| 1,561,063 | 11/1925 | Dunlap . |
| 2,571,604 | 10/1951 | Payzant . |
| 2,708,649 | 5/1955 | Cunningham . |
| 2,908,600 | 10/1959 | Nicholson . |
| 3,316,948 | 5/1967 | Drake . |
| 3,888,715 | 6/1975 | Fraser et al. ..................... 156/274.6 |
| 3,990,937 | 11/1976 | Knowles . |
| 4,314,871 | 2/1982 | Winstock et al. . |
| 4,456,498 | 6/1984 | Churchland . |
| 4,994,138 | 2/1991 | Prihoda . |
| 5,050,653 | 9/1991 | Brown . |
| 5,240,050 | 8/1993 | Shing . |
| 5,376,220 | 12/1994 | Campbell ......................... 156/583.5 |
| 5,537,919 | 7/1996 | Bielfeldt et al. . |

OTHER PUBLICATIONS

Carruthers, J. F. S. "The Risborough Continuous Laminating Machine" Wood. Oct. 1965, pp. 51–54, Oct. 1955.

Primary Examiner—Michael W. Ball
Assistant Examiner—Michael A Tolin
Attorney, Agent, or Firm—Loeb & Loeb LLP

[57] ABSTRACT

Apparatus for continuously processing wood product formed from random lengths of wood strips assembled in face-to-face relationship with heat curable adhesive applied to adjacent contacting faces of the strips includes a pair of opposed, parallel, linear arrays of electrically insulative blocks, the linear arrays of blocks having inner, confronting faces spaced apart transversely to define an elongated, longitudinally extending press zone into which the product is adapted to be fed. A drive motor is coupled to each linear block array for moving the arrays in the same direction in unison to thereby advance the stock in the press zone. An adhesive RF curing zone substantially coextensive with the press zone is defined by the inner confronting faces of the block arrays and first and second elongated, parallel RF electrodes disposed between the confronting inner faces of the block arrays. At least the first electrode having inner and outer surfaces is disposed in its entirety within the confines of the press zone. A longitudinally extending bar of insulative material may be attached to the outer surface of the first electrode.

17 Claims, 7 Drawing Sheets

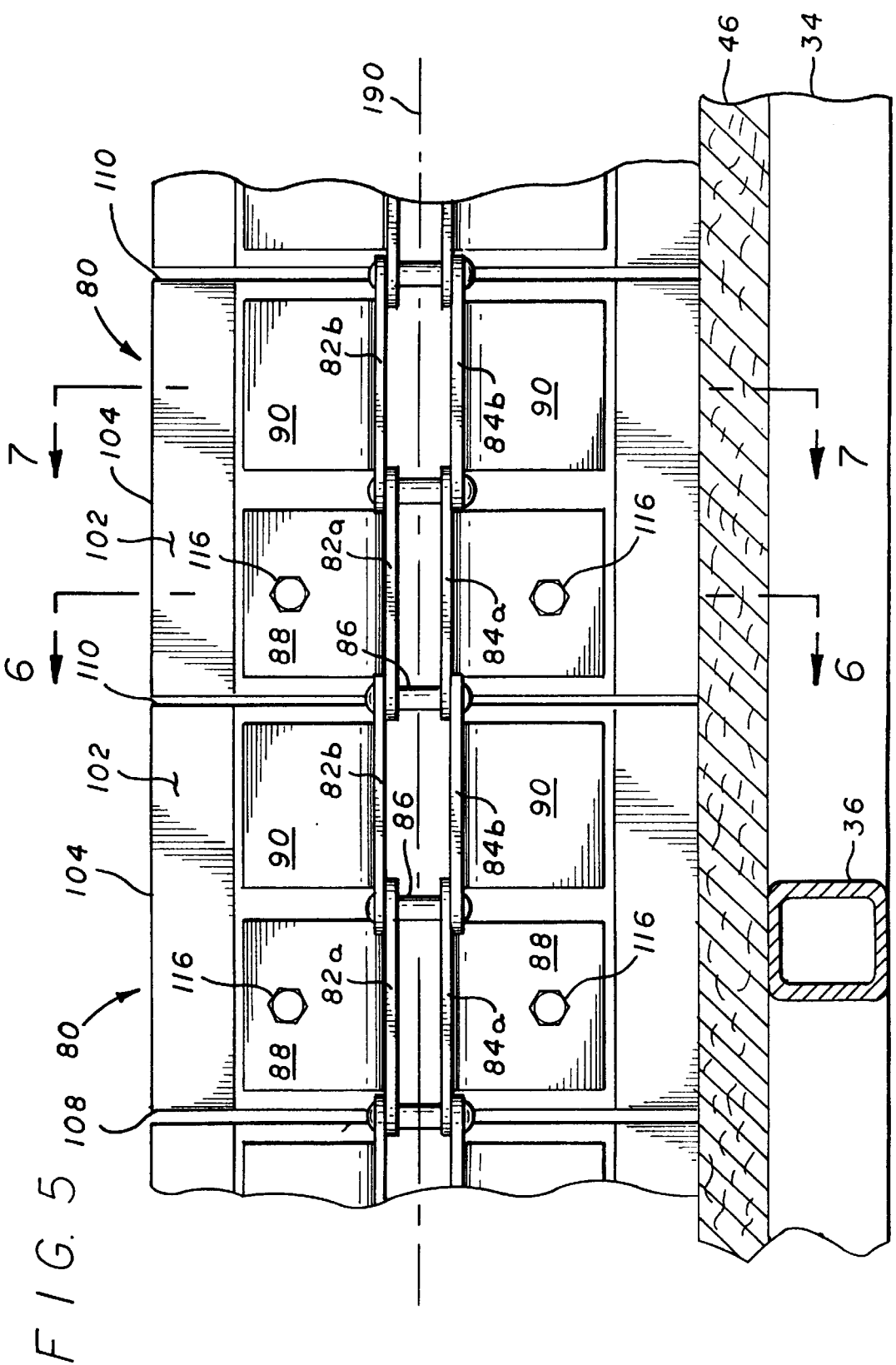

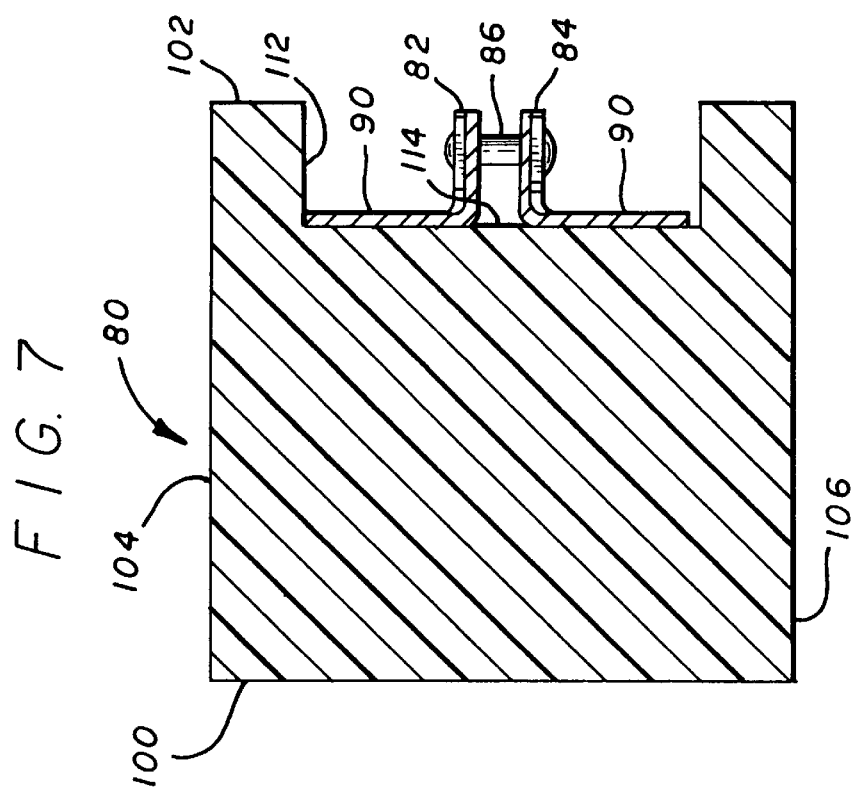
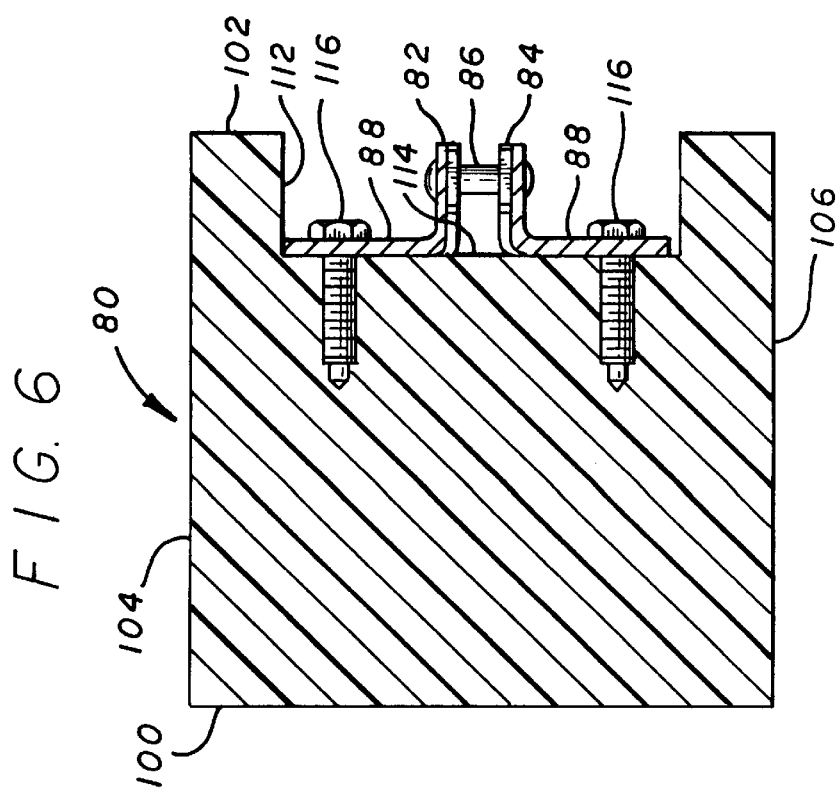

ically, the product 10 is
formed by laminating together scrap wood strips 12 of
APPARATUS AND METHOD FOR MANUFACTURING CONTINUOUS LAMINATED WOOD STOCK

FIELD OF THE INVENTION

This invention relates generally to improved apparatus and methods for manufacturing on a continuous basis laminated wood stock from wood strips of random length.

BACKGROUND OF THE INVENTION

It has long been known to manufacture face-laminated wood stock on a continuous basis from wood strips of random length by assembling the strips in face-to-face relationship with heat curable glue between the adjacent faces of the strips and feeding the assembled strips between the confronting, inner, parallel runs of a pair of continuously moving chains or belts. The inner runs of the chains or belts apply pressure to the opposite faces of the assembled stock while continuously advancing the stock. Curing of the adhesive is accelerated by passing the stock between upper and lower radio frequency (RF) electrodes while the stock is within the confines of the continuous press. Parameters including the capacity of the RF generator and the speed of the stock are adjusted so that the adhesive is completely cured when the stock emerges from the continuous press.

One problem with prior art continuous presses of the kind described above is that arcing or RF energy leakage can occur between the electrode connected to the RF source and surrounding metallic structure, such as frame members, drive chains, and so forth. Such arcing or leakage results in RF energy losses and consequent failure to adequately cure the glue along the glue lines.

Another problem with some prior art continuous presses is that they do not apply sufficient pressure to the laminated wood product uniformly along the entire length of the RF curing stage. As a result, localized separations can occur between adjacent strips. Such separations can allow arcing between the RF electrodes and burning of the adhesive resulting in gaps along the cured glue lines of the finished product.

SUMMARY OF THE INVENTION

An overall object of the present invention is to improve upon prior continuous press apparatus and methods for forming laminated wood stock. The elements of the continuous press of the present invention are so constructed and disposed relative to each other that the curing RF energy field is isolated from surrounding metallic structure so as to prevent arcing and other losses of RF energy. In addition, the present invention provides a continuous press that applies sufficient pressure uniformly across the width of the moving stock along the entire length of an RF curing zone to prevent localized separation of adjacent strips.

In accordance with one specific, exemplary embodiment of the invention, there is provided an apparatus for continuously processing a wood product formed from lengths of wood strips assembled in face-to-face, laminated relationship with heat curable adhesive applied to adjacent contacting faces of the strips. The apparatus includes a continuous press comprising confronting members defining between them an elongated press zone extending in a longitudinal direction. The confronting members are adapted to apply pressure to the wood product in a transverse direction substantially normal to the faces of the assembled strips while advancing the wood product through the press zone.

The apparatus further includes first and second parallel electrodes coextensive with at least a portion of the press zone, the first and second electrodes being separated by an interelectrode spacing and defining between them a curing zone. The first electrode is connectable to a source of RF energy and the second electrode is connectable to ground potential. To provide the required isolation of the RF field and prevent arcing and other losses of RF energy, the interelectrode spacing is less than the distance between the first electrode and any adjacent metallic members. In this fashion, the RF field along the entire length of the curing zone is substantially confined between the electrodes.

In accordance with another aspect of the invention, the confronting members of the continuous press comprise first and second linear arrays of blocks made of electrically insulative material, each block having a first or front face adapted to engage the wood product, and a second or rear face opposite the first face. Drive elements, preferably in the form of the links of a steel chain, are coupled to the second faces of the blocks and are driven so as to move the linear arrays of blocks along the press zone. The depth of the blocks, that is, the distance between the front and rear faces of the blocks is greater than the interelectrode spacing to prevent arcing between the first electrode and the steel chain. The blocks are disposed in side-by-side relationship with the sides of adjacent blocks in close proximity so that uniform pressure is applied across the laminated wood product along the entire length of the press zone so as to prevent localized separations from forming between laminations.

BRIEF DESCRIPTION OF THE DRAWINGS

Further objects, features and advantages of the invention will become evident from the detailed description below when read in conjunction with the accompanying drawings in which:

FIG. 5 is a side elevation view, partly in cross section, of a portion of the rear of one of the inner linear runs of the continuous press shown in FIG. 1, as seen along the line 5—5 in FIG. 3;

FIGS. 6 and 7 are end elevation views, in cross section, of one of the blocks of the continuous press of the invention, as seen along the lines 6—6 and 7—7, respectively, in FIG. 5.

DETAILED DESCRIPTION OF THE PREFERRED EMBODIMENTS

Figure 8:
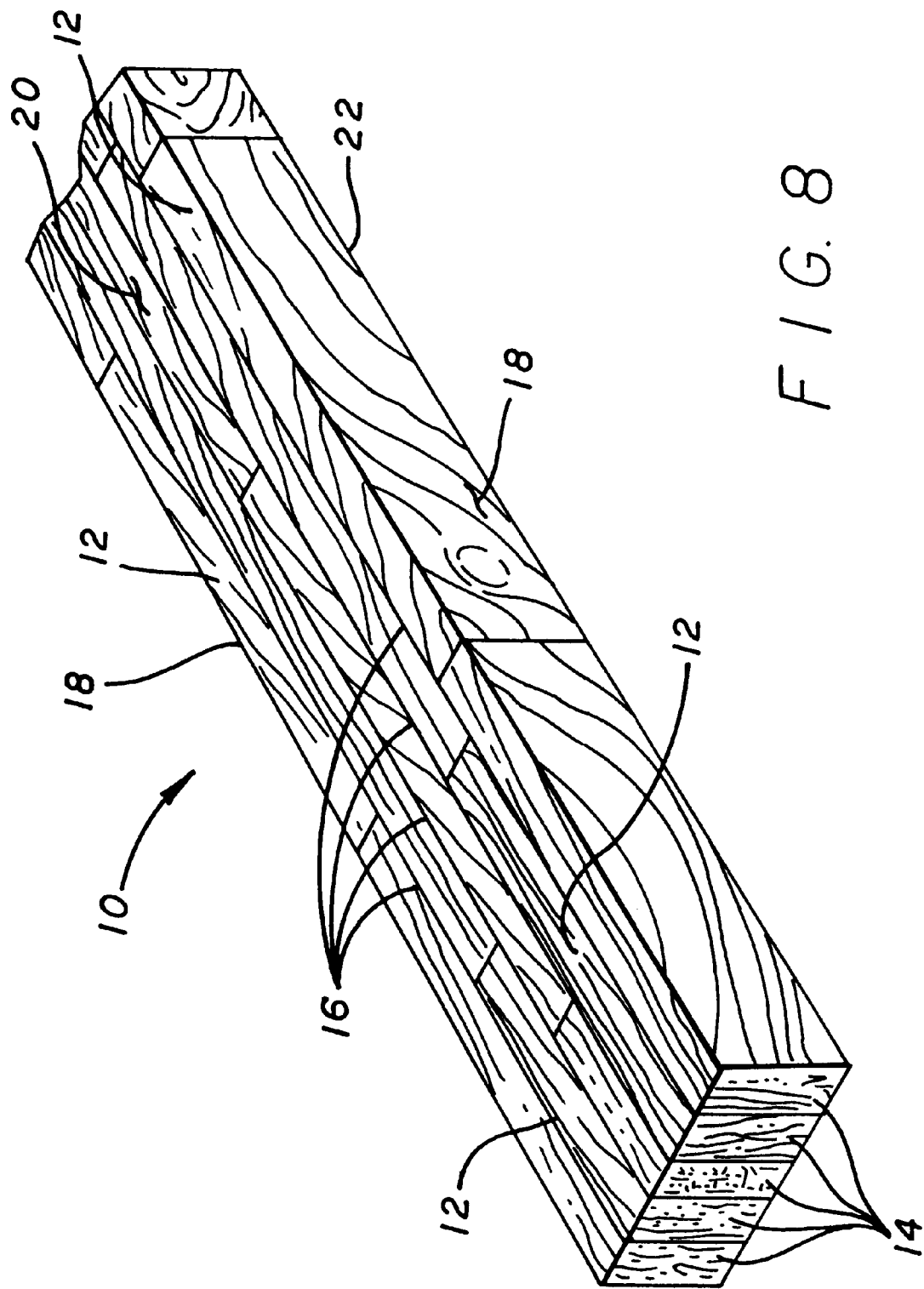
FIG. 8 is a perspective view of a portion of 2×4 wood stock processed by the apparatus of FIG. 1.

Turning first to FIG. 8, there is shown a representative length of a face-laminated wood product 10 as it would appear both before and after processing by the apparatus and method of the present invention. Basically, the product 10 is formed by laminating together scrap wood strips 12 of random lengths cut to uniform thickness and width. For example, the face-laminated wood product 10 shown in FIG. 8 includes five laminations 14, joined along four parallel, longitudinally extending glue lines 16 to form a product of uniform cross-section including parallel outer side faces 18 and parallel top and bottom substantially planar surfaces 20 and 22, respectively, defined by the co-planar edges of the laminated rows of wood strips 12. Five adhesively bonded laminations measuring about $^{11}/_{16}$ inch thick by $1^5/_8$ inches wide can be finished to form low-cost yet high-strength 2×4 stock usable for a variety of industrial and commercial purposes including the fabrication of low-cost expendable items such as pallets. The wood product 10 fabricated in accordance with the present invention may be made continuously (that is, without interruption in the operation of the apparatus) and of any length desired by assembling any number of wood strips end-to-end in each row of the laminated stock.

Turning now to FIGS. 1–7, there is shown a continuous press 30 into which the assembled, uncured wood product 10 of FIG. 8 is continuously fed from an infeed make-up and glue spreader apparatus (not shown). In the infeed apparatus, the contacting faces of adjacent wood strips 12 are coated with heat curable glue and the glue-coated wood strips are assembled into the relationship shown in FIG. 8. Heat curable glues of the kind used here are well known in the art and typically comprise a two part composition including a suitable catalyst. The continuous press 30 includes a rigid frame 32 comprising horizontal, longitudinally extending frame members 34 connected by transverse frame members 36 and supported at an appropriate height by legs (not shown). only portions of the frame 32 are shown; the construction of such frames utilizing, for example, square and/or rectangular steel tubing of appropriate sizes, is well known.

The continuous press 30 further includes a pair of horizontal, endless tractor assemblies 38, 40 arranged side-by-side and extending longitudinally between a product infeed end 42 and an outfeed end 44. Each tractor assembly 38, 40 is supported by an electrically insulative base sheet 46 mounted on the frame 32. The base sheet 46 may comprise a phenolic sheet having a thickness of, for example, ½ inch.

Each tractor assembly 38, 40 includes an endless steel drive chain 50 trained about a drive sprocket 52 at the product outfeed end 44 and a tensioning idler sprocket 54 at the product infeed end 42 of the press. The drive and idler sprockets 52 and 54 are made of electrically insulative material such as ultra high molecular weight (UHMW) plastic or the like. Each drive sprocket 52 is mounted on a shaft 56 rotatably driven by a motor 58. The drive motor 58 may be powered electrically or hydraulically and may have an associated speed-reducing transmission for applying the requisite torque to each drive sprocket 52. The rotational speed and diameter of the counterrotating sprockets 52 determine the rate at which the wood product 10 is drawn through the press 30 from the infeed end to the outfeed end. For example, 12 inch diameter drive sprockets 52 driven at about 10 rpm will advance the product 10 through the press 30 at about 30 feet per minute.

Each tensioning idler sprocket 54 at the product infeed end of the continuous press 30 is mounted on a shaft 60. The shaft 60 is mounted on the free end of a hinged arm 62 whose other end is attached to a vertical pivot shaft 64 carried by the frame 32. Each idler sprocket 54 is biased away from the associated drive sprocket 52 by means of a tensioner 66 connected by a coupling 68 to the arm 62 to appropriately tension the chain 50. The sprockets 54 are adjustable along the hinged arms 62 relative to the frame to permit transverse alignment of the chains 50 as required. The drive sprockets 52 may be similarly adjustably mounted. The details of the tensioners 66 and adjustable sprocket mountings are not shown, since these are expedients well known in the sprocket and chain drive technology.

Figure 1:
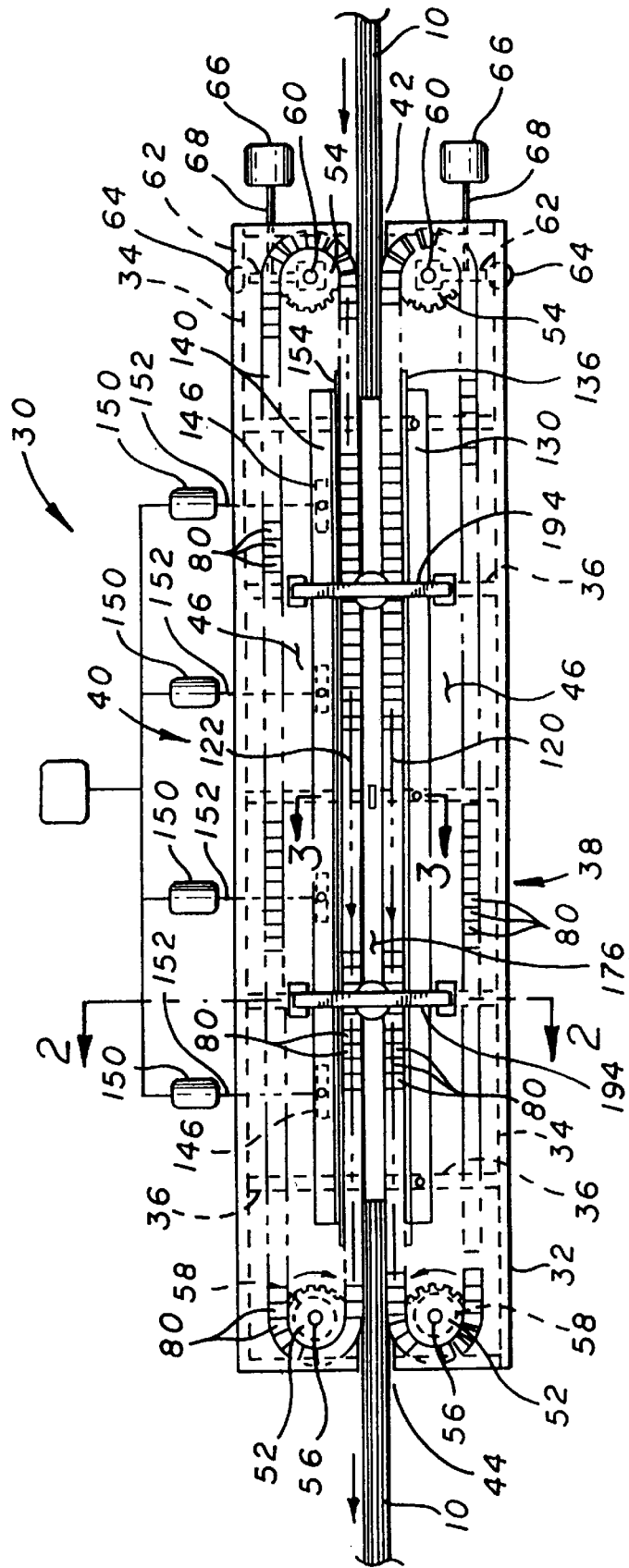
FIG. 1 is a top plan view of a laminated wood stock fabricating apparatus, including a continuous press, in accordance with the present invention.
Figure 2:
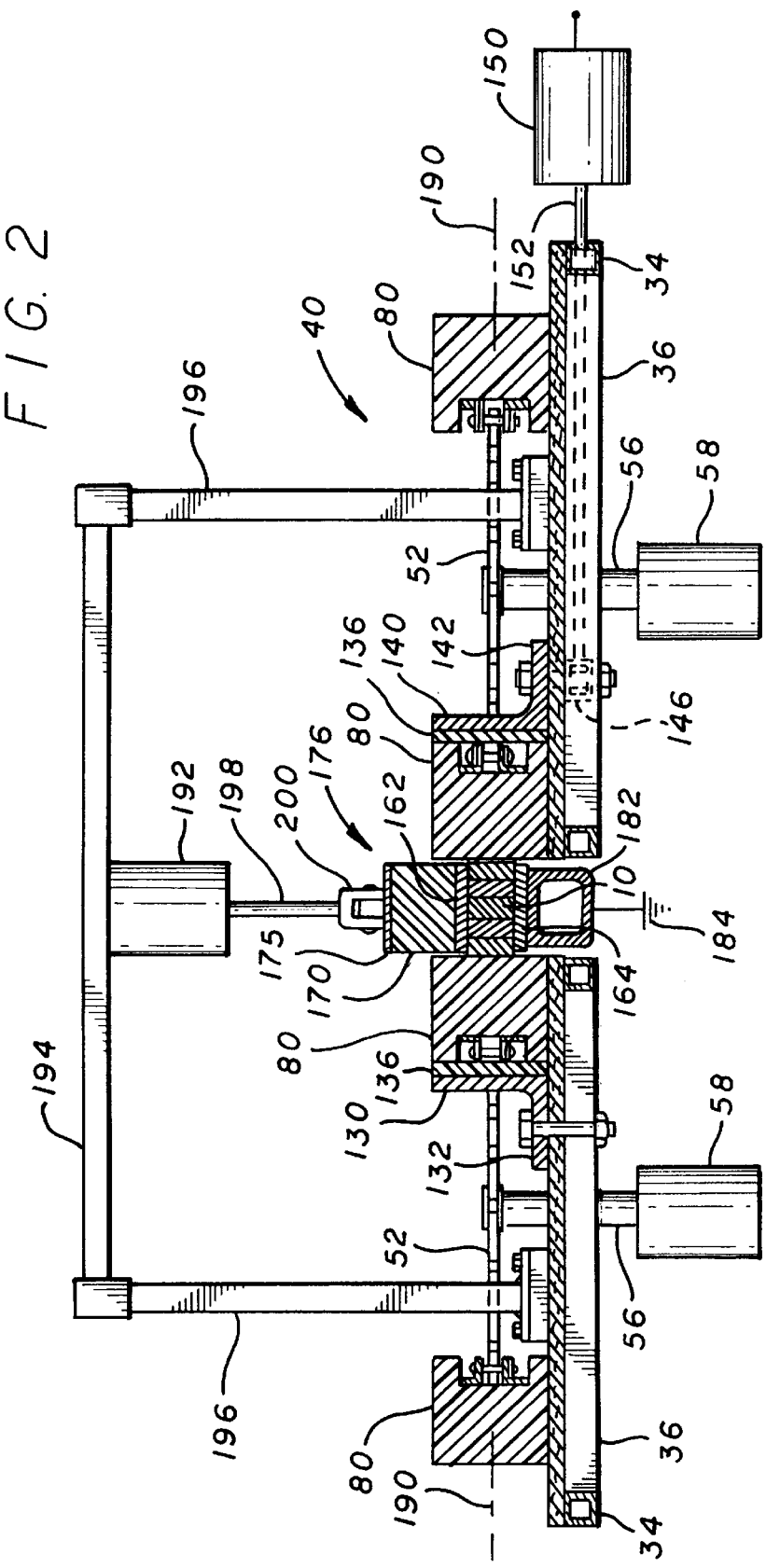
FIG. 2 is a transverse cross section of the apparatus of FIG. 1, as seen along the line 2—2 in FIG. 1.
Figure 3:
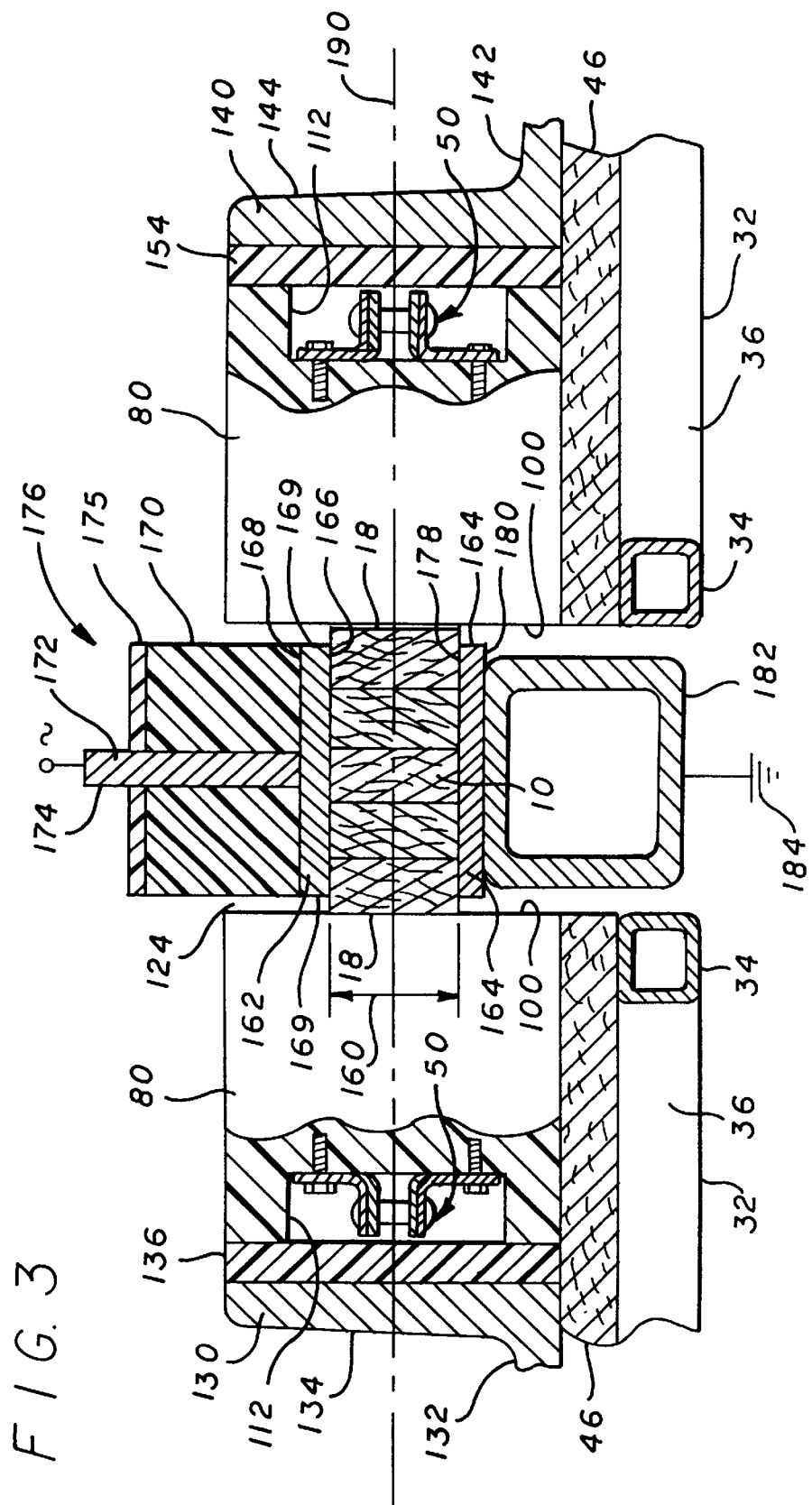
FIG. 3 is a transverse cross section of a portion of the apparatus of FIG. 1, as seen along the line 3—3 in FIG. 1.
Figure 4:
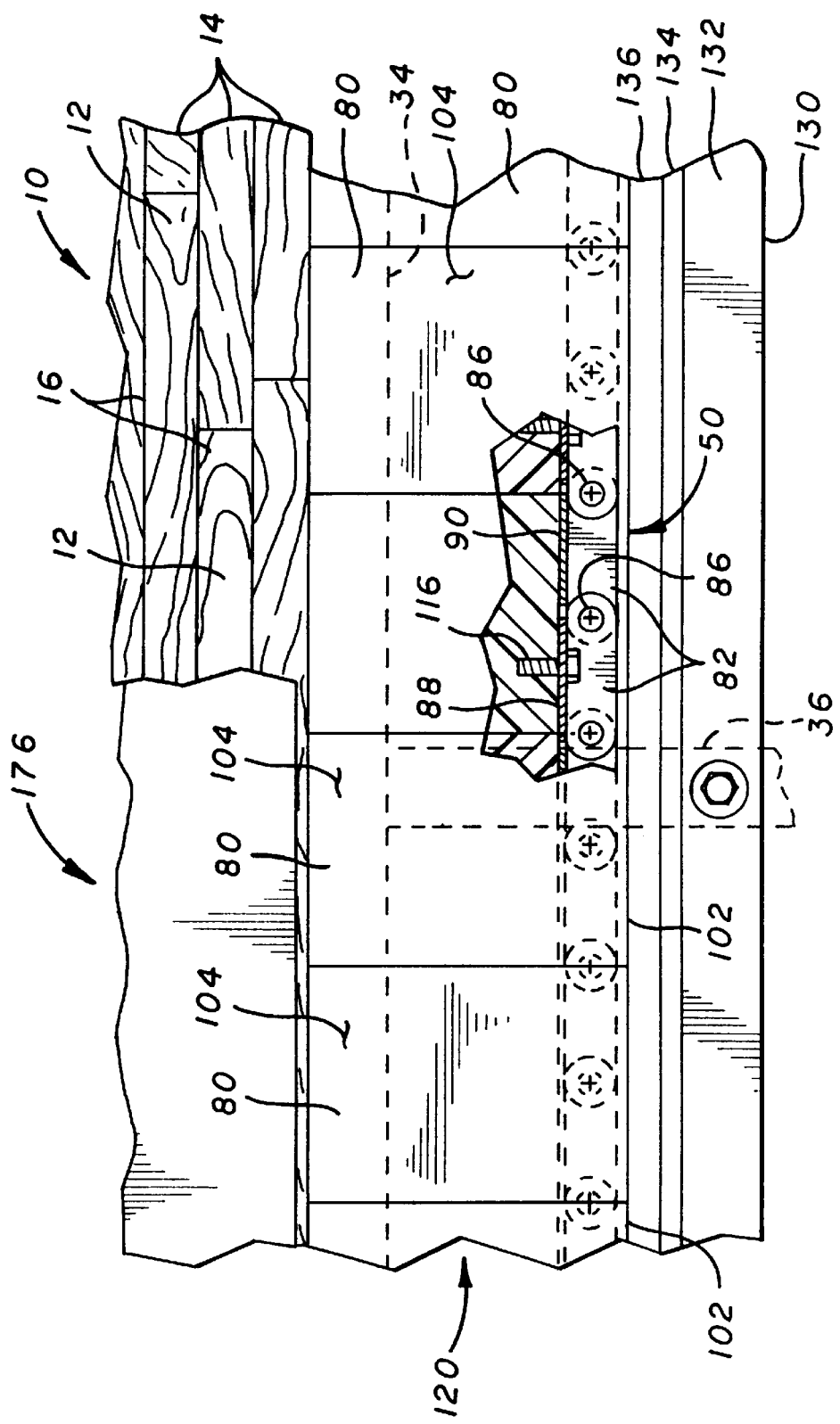
FIG. 4 is an enlargement, partly in cross section, of a portion of the top plan view of FIG. 1.

Each tractor assembly 38, 40 includes a series of tractor blocks 80 disposed side-by-side in abutting, or nearly abutting relationship. The tractor blocks 80 are secured to an associated chain 50 so as to be driven thereby. As best seen in FIGS. 3–7, each drive chain 50 is made up of a series of articulated upper and lower links 82 and 84, respectively, joined by drive pins 86. Alternate corresponding pairs of upper and lower links 82a, 84a include lugs 88 bent outwardly perpendicular to the links; similarly, the intervening corresponding upper and lower links 82b, 84b include similarly bent lugs 90. Each link set 82a, 82b, 84a, 84b is associated with one of the tractor blocks 80 (FIGS. 4 and 5).

The tractor blocks 80 are fabricated from an electrically insulative, high strength, low friction coefficient material such as UHMW plastic. Each tractor block 80 has parallel front and rear faces 100 and 102, respectively, parallel top and bottom faces 104, 106, and parallel side faces 108, 110. The dimensions of the tractor blocks 80 may vary depending on the cross-sectional shape and size of the specific wood product 10 to be fabricated along with other factors including the need to isolate the RF field within the curing zone from the steel chain 50. By way of example only, in accordance with one practical form of the invention for processing 2×4 stock having prefinished nominal cross-sectional dimensions of approximately $1^5/_8 \times 3^1/_2$ inches, each block has a width (between side faces 108, 110) of 4 inches, a depth (between front and rear faces 100, 102) of 4 inches and a height (between top and bottom faces 104, 106) of 3 inches. The rear face 102 of each block 80 has a horizontal channel 112 defined by an inner, vertical wall 114, to provide a recess for the drive chain 50. In accordance with the foregoing example, the channel may be about 1 inch deep. A set of chain links 82a, 82b, 84a and 84b and their associated lugs 88 and 90 are received within the confines of the channel 112 of each block 80. Machine screws 116 attach the opposed upper and lower pairs of lugs 88 to the inner wall 114 of each tractor block 80; alternate lug pairs 90 are not secured to the blocks so as to permit each block to swing freely away from the unattached lug 90 while travelling around the sprockets 52 and 54. The machine screws 116 are preferably made of an electrically insulative material such as nylon. It will thus be seen from FIGS. 6 and 7, for example, that the steel chain 50 and the front face 110 of each block 80 are separated by about 3 inches of electrically insulative material.

The endless tractor assemblies 38 and 40 include inner, linear arrays or runs 120 and 122, respectively, of aligned tractor blocks 80 whose front, rear and bottom faces 100, 102, 106 are substantially coplanar. The opposed inner, linear runs 120, 122 of the pair of tractor assemblies 38, 40 are parallel and the confronting, front faces 100 of the blocks 80 along substantially the entire length of the inner linear tractor block runs 120, 122 define between them an elongated press zone 124 of uniform, rectangular cross-section. The product 10 travels through the press zone 124 in a longitudinal direction from infeed to outfeed at a predetermined rate, as described above, during which pressure is applied by the linear block arrays 120, 122 transversely across the side faces 18 of the product 10, that is, normal to the planes of the glue lines 16. The tractor blocks 80 are supported by and slide with minimum friction along the phenolic base sheets 46. The tension applied to the drive chains 50 by the tensioners 66 helps to further reduce friction between the moving tractor blocks 80 and the phenolic base sheets 46.

The linear tractor block run 120 of the tractor assembly 38 is backed by a linear guide in the form of a stationary steel angle 130 having a horizontal flange 132 bolted to the frame 32 and a vertical flange 134 having a height approximately equal to that of the tractor blocks 80. The steel angle 130 extends longitudinally substantially the entire length of the inner linear tractor block run 120, the angle being so positioned that the rear faces 102 of the tractor blocks 80 along the inner run 120 bear against the vertical flange 134 of the angle. To reduce friction, a sheet 136 of UHMW plastic or like electrically insulating, low friction material, may be attached to the vertical flange 134 so as to be interposed between the rear faces 102 of the moving tractor blocks and the stationary vertical flange 134 of the angle 130. The contacting surfaces of the blocks 80 and plastic sheet 136 can be lubricated to further reduce to near zero the coefficient of friction of the relatively moving surfaces.

The inner tractor block run 122 of the tractor assembly 40 is backed by a linear guide in the form of a steel angle 140 identical to and coextensive with the fixed angle 130. The angle 140 comprises a horizontal flange 142 and a vertical flange 144. The horizontal flange 142 is secured along the length of the angle 140 to movable frame members 146. Several, for example, four, actuators in the form of air cylinders 150 are coupled to the movable frame members 146 by actuator rods 152. The movable angle 140 is disposed so that the rear faces 102 of the tractor blocks 80 along the inner linear tractor block run 122 are engaged by the vertical flange 144. Again, to reduce friction, a sheet 154 of UHMW plastic or like low friction electrically insulative material may be interposed between the rear faces 102 of the blocks and the vertical flange 144. A lubricant may be applied to the relatively movable surfaces along the linear run 122 to further reduce friction. Air introduced into the air cylinder actuators 150 at an appropriate pressure, for example, 150 psi, causes the air cylinders 150 to urge the movable angle 140 toward the fixed angle to apply to the wood product 10 disposed between the confronting faces 100 of the blocks 80 within the press zone 124 the relatively high transverse pressure required to eliminate any separation or gaps between the faces of adjacent laminations of the wood product 10. Further in this connection, the spacing between adjacent blocks 80 along the linear runs 120 and 122 is preferably minimized. Thus, adjacent blocks 80 may be disposed in close proximity to each other, that is, in abutting, or near abutting, relationship with spacings between the side faces 108, 110 of adjacent blocks being preferably ⅛-inch or less.

As the wood product 10 is advanced by the tractor assemblies 38 and 40 through the press zone 124 defined by the confronting inner linear tractor block runs 120, 122, the product passes through an adhesive curing zone 160 wherein the curing of the heat curable adhesive is accelerated. The curing zone 160 is defined by upper and lower parallel, elongated RF electrodes 162 and 164, respectively, extending longitudinally along at least a portion of the length of the press zone 124 and preferably along substantially a major portion of that length. In accordance with one practical form of the invention, the length of the upper and lower RF electrodes 162, 164 is twelve (12) feet while the length of the linear tractor runs 120, 122 is eighteen (18) feet. These lengths, of course, may be varied depending on the RF energy applied, the rate at which the stock 10 is advanced by the tractor assemblies 38, 40, the chemistry and composition of the heat curable adhesive, and so forth. These parameters and their adjustment and optimization will be evident to those skilled in the art.

By way of example, the upper electrode 162 may comprise a ½-inch thick plate of aluminum or similarly electrically conductive material, 3 inches wide and, as indicated, 12 feet long. The upper electrode 162 has an inner face 166, an outer face 168, and side edges 169. Secured to the outer face 168 of the electrode 162 is a bar 170 of UHMW plastic, or similar electrically insulative, high-strength material. By way of example, the bar 170 may have a 3 inch square cross section. Centrally located along the length of the upper electrode 162 and attached to the outer face 168 thereof is a vertical, electrically conductive post 172 having an upper end 174 projecting from the top of the insulating bar 170 for connection to an RF generator (not shown). A thin phenolic sheet 175 overlies the top surface of the bar 170; the upper electrode 162, the bar 170 and phenolic sheet 175 comprise an upper electrode assembly 176.

The RF generator should be selected to have an output to heat the glue lines 16 sufficiently so that the glue is substantially completely cured when the stock emerges from the curing zone. For example, given a residency time of 24 seconds within the curing zone (12 feet at 30 feet per minute) a 15 KW, 50 amp RF generator can be used for a product measuring 1⅝×3½ inches with four parallel, vertically oriented glue lines 16.

The lower electrode 164 may comprise, for example, a ½-inch thick steel plate, 3 inches wide and 12 feet long, disposed parallel and coextensive with the upper electrode 162. The lower electrode 164 has an inner face 178 and an outer face 180. The lower electrode is adjustably clamped along its outer face 180 to a longitudinal frame member 182 which may comprise a 3-inch square steel tube connected to electrical ground potential 184.

The opposed inner faces 166, 178 of the upper and lower electrodes 162, 164 define the curing zone 160 which is preferably positioned vertically so as to be symmetrical about a horizontal, central plane 190 that extends through the tractor blocks 80 midway between the top and bottom faces 104, 106 thereof and through the central plane of the drive and idle sprockets 52 and 54 and the chain 50. It thus will be seen that the compressing force applied by the air cylinders 150 to the wood product 10 through the angles 130 and 140 and the tractor blocks 80 will be applied to the product 10 uniformly and symmetrically about the central plane 190.

The upper electrode assembly 176 is biased downwardly by a plurality of actuators 192 (two of which are shown by way of example) spaced along the length of the bar 170. The actuators may take the form of air cylinders. The force applied by the air cylinders 192 to the upper electrode 162 assures that the inner face 166 of the upper electrode is maintained in firm engagement with the top surface 20 of the travelling wood product 10. Each air cylinder actuator 192 is mounted on an overhead, transverse frame member 194 having legs 196 secured to the frame 32. Each air cylinder actuator 192 has a piston rod 198 whose lower end is attached to the upper electrode insulating bar 170 by means of a clevis and pin assembly 200. Air at 30 psi, for example, admitted into the air cylinder actuators 192 causes the actuators to apply a steady downward pressure on the upper electrode assembly 176 and wood product 10, that pressure being resisted by the lower, fixed ground electrode 164. The actuators 192 can be used to raise the upper electrode assembly 176 to gain access to the press zone for maintenance.

It will thus be seen that the present invention provides a continuous press including an RF curing zone that is sufficiently isolated from surrounding metal members to prevent arcing and/or RF energy losses. Thus, the interelectrode spacing separating the inner faces 166 and 178 of the upper and lower electrodes 162, 164 is substantially less than the distances from the upper electrode edges 169 to the closest surrounding metallic structure. The electrically insulative sprockets 52 and 54 isolate the steel chain 50 from the metal frame 32, and by minimizing the spacings between adjacent blocks 80, leakage of RF energy from the upper electrode 162 to the chain 50 is further inhibited. In addition, the product 10 moves within press and curing zones that are preferably symmetrically positioned about the horizontal central plane 190. Such positioning in combination with the application of sufficient pressure to the product through the closely spaced blocks 80, prevents separation of the laminations as the product is being processed.

While the present invention has been described with reference to particular illustrative embodiments, the invention is not intended to be restricted to those embodiments but only by the appended claims. It will be appreciated that those skilled in the art can change or modify the described embodiments, or substitute equivalents for the various elements described and shown, without departing from the scope and spirit of the invention.

What is claimed is:

1. An apparatus for continuously processing a wood product formed from lengths of wood strips assembled in face-to-face, laminated relationship with heat curable adhesive applied to adjacent contacting faces of the strips, the apparatus including a continuous press comprising:

a plurality of confronting members defining between them an elongated press zone extending in a longitudinal direction, the confronting members being adapted to apply pressure to the wood product in a transverse direction substantially normal to the faces of the assembled strips while advancing the wood product through the press zone; and first and second parallel electrodes coextensive with at least a portion of the press zone and defining between them an RF curing zone, the first electrode being connectable to a source of RF energy and being disposed in its entirety within the press zone.

2. An apparatus, as defined in claim 1, in which:

the second electrode is connectable to ground potential, the first and second electrodes being separated by an interelectrode spacing, said spacing being less than the distance between the first electrode and any adjacent metallic members.

3. An apparatus, as defined in claim 1, in which:

the confronting members have a substantially uniform height defined by top and bottom, substantially parallel surfaces, the first electrode having inner and outer transverse surfaces, the outer surface of the first electrode being disposed below the top surfaces of the confronting members.

4. An apparatus, as defined in claim 3, in which:

the first electrode has a length and a width; and the apparatus further includes:

a longitudinally extending bar of electrically insulative material attached to the outer surface of the first electrode, said bar having a length and width substantially coextensive with the length and width of the first electrode.

5. An apparatus, as defined in claim 4, in which:

the electrically insulative bar has an upper transverse surface, the upper surface of the bar being disposed above the upper surfaces of the blocks.

6. Apparatus for continuously processing wood product formed from random lengths of wood strips assembled in face-to-face relationship with heat curable adhesive applied to adjacent contacting faces of the strips, the apparatus comprising:

a pair of opposed, parallel, linear arrays of electrically insulative blocks, the linear arrays of blocks having inner, confronting faces spaced apart transversely to define an elongated, longitudinally extending press zone into which the product is adapted to be fed;

a drive motor coupled to each linear block array for moving the arrays in the same direction in unison to thereby advance the stock in the press zone;

at least one actuator coupled to at least one of the linear block arrays for urging the at least one linear block array toward the other linear block array along substantially the entire length of the press zone to thereby press together the wood strips along substantially the entire length of the press zone; and an adhesive curing zone substantially coextensive with the press zone along at least a portion of the length of the press zone, the curing zone being defined by:

the inner confronting faces of the block arrays;

a first elongated electrode; and a second elongated electrode disposed parallel with the first electrode, the first electrode being adapted to be connected to an RF source and the second electrode being adapted to be connected to ground potential, the electrodes being disposed between the confronting inner faces of the block arrays, at least the first electrode being disposed in its entirety within the confines of the press zone.

7. An apparatus, as defined in claim 6, in which:

the apparatus includes metallic elements; and the metallic elements are spaced a sufficient distance from the first electrode to isolate the RF energy generated by the RF source and avoid leakage thereof, thereby substantially confining the RF energy between the first and second electrodes.

8. An apparatus, as defined in claim 6, in which:

the blocks of each linear array of blocks are arranged side-by-side in close proximity.

9. An apparatus, as defined in claim 6, which includes:

at least one second actuator, the at least one second actuator being coupled to the first electrode to urge the first electrode toward the second electrode to maintain the first and second electrodes in engagement with the upper and lower surfaces of the wood stock during the travel of the stock through the curing zone.

10. An apparatus, as defined in claim 6, in which:

the blocks of each linear block array have rear surfaces; and which apparatus further includes:

a drive member connected to the rear surfaces of the blocks of each linear block array, each drive member being coupled to be driven by one of said drive motors.

11. An apparatus, as defined in claim 10, in which:

each drive member comprises an articulated, endless chain; the apparatus further including:

a sprocket adapted to be rotatably driven by each drive motor, each sprocket engaging one of the endless chains to drive the chain.

12. An apparatus, as defined in claim 11, in which:

the first and second electrodes are separated by an interelectrode spacing;

the endless chains are made of metal, the distance between the first electrode and each chain being greater than the interelectrode spacing; and the sprockets are made of an electrically insulative material.

13. An apparatus, as defined in claim 6, in which:

each linear array of blocks is supported by a base, the base being made of an electrically insulative material.

14. An apparatus, as defined in claim 6, in which:

the blocks of each linear array of blocks have a uniform height defined by upper and lower parallel surfaces; and the first electrode has inner and outer transverse, parallel surfaces, the outer surface of the first electrode being disposed below the upper parallel surfaces of the blocks.

15. An apparatus, as defined in claim 14, in which:

the curing zone has a height less than the height of the blocks, the curing zone being disposed substantially symmetrically between the upper and lower surfaces of the blocks.

16. An apparatus, as defined in claim 6, in which:

the first electrode has an inner transverse surface, an outer transverse surface, a length and a width; and the apparatus further includes:

a longitudinally extending bar of electrically insulative material attached to the outer surface of the first electrode, said bar having a length and a width substantially coextensive with the length and width of the first electrode.

17. An apparatus, as defined in claim 16, in which:

the electrically insulative bar has an upper transverse surface, the upper surface of the bar being disposed above the upper surfaces of the blocks.

* * * * *